United States Patent [19]

von Lersner et al.

[11] 4,402,987

[45] Sep. 6, 1983

[54] NUTRITIONALLY ENRICHED AND STABILIZED MEAT PRODUCTS AND METHOD OF PRODUCING SUCH PRODUCTS

[75] Inventors: Wolf A. von Lersner, Cherry Hill, N.J.; Barron M. Unger, Manchester, England

[73] Assignee: Campbell Soup Company, Camden, N.J.

[21] Appl. No.: 300,623

[22] Filed: Sep. 9, 1981

[51] Int. Cl.$^3$ .......................... A23L 1/31; A23L 1/30; A23L 1/01; A22C 17/00

[52] U.S. Cl. .................................... 426/281; 426/646; 426/652

[58] Field of Search ........................ 426/281, 646, 652

[56] References Cited

U.S. PATENT DOCUMENTS

| | | |
|---|---|---|
| Re. 30,023 | 6/1979 | Hawley et al. . |
| 187,865 | 2/1877 | Johnston ............................ 426/646 |
| 2,128,952 | 2/1936 | Mareta . |
| 2,162,047 | 6/1939 | Allen . |
| 2,418,914 | 4/1947 | Tichy . |
| 3,035,508 | 5/1962 | Nelson . |
| 3,147,122 | 9/1964 | Williams . |
| 3,216,826 | 11/1965 | Wattenbarger . |
| 3,348,954 | 10/1967 | Green .................................. 426/646 |
| 3,366,491 | 1/1968 | Schwall et al. . |
| 3,506,455 | 4/1970 | Savage et al. . |
| 3,511,164 | 5/1970 | Strandine et al. . |
| 3,528,820 | 9/1970 | Schwall et al. . |
| 3,556,808 | 1/1971 | Panek . |
| 3,573,063 | 3/1971 | Williams . |
| 3,615,689 | 10/1971 | Malinow . |
| 3,649,299 | 3/1972 | Sholl . |
| 3,695,892 | 10/1972 | Reinke . |
| 3,754,302 | 8/1973 | Blair et al. . |
| 3,769,037 | 10/1973 | Sholl . |
| 3,804,954 | 4/1974 | Clardy . |
| 3,835,223 | 9/1974 | Schwall et al. . |
| 3,863,556 | 2/1974 | Townsend . |
| 3,922,357 | 11/1975 | Townsend . |
| 3,946,117 | 3/1976 | Blair et al. . |
| 3,950,555 | 4/1976 | Stromberg . |
| 4,029,824 | 6/1977 | Langen . |
| 4,036,122 | 7/1977 | Langen . |
| 4,123,557 | 10/1978 | Epstein et al. ...................... 426/646 |
| 4,142,000 | 2/1979 | Townsend . |
| 4,164,589 | 8/1979 | Kadane et al. . |
| 4,220,669 | 9/1980 | Townsend . |
| 4,287,218 | 9/1981 | Rich et al. ........................... 426/281 |

Primary Examiner—Jeanette M. Hunter
Attorney, Agent, or Firm—Schuyler, Banner, Birch, McKie & Beckett

[57] ABSTRACT

A nutritionally enriched and stabilized meat product is prepared by introducing an aqueous colloidal dispersion of insoluble animal protein particles and a binder which sets up at cooking temperatures into the tissue structure of a solid animal meat mass, preferably of the same species. The process can be used to upgrade low quality meat cuts, to increase the yield of meat products, to increase the total protein base of meat products and to reduce cooking losses.

20 Claims, No Drawings

NUTRITIONALLY ENRICHED AND STABILIZED MEAT PRODUCTS AND METHOD OF PRODUCING SUCH PRODUCTS

BACKGROUND OF THE INVENTION

1. Field of the Invention

The present invention relates to improved food products for human consumption and more particularly to nutritionally enriched and stabilized meat products and the method for producing such products.

2. Description of the Prior Art

The process of cooking animal meat products will render out valuable nutrients which often cannot be recovered. A typical beef cut, for example, will loose up to 35% of its original weight when water cooked. While these yield losses can be somewhat ameliorated by prior art techniques including injection with chemicals such as phosphates or massaging with salt, these techniques are not completely satisfactory and often involve chemical additives which are not permitted in food products in any appreciable quantities. The prior art has also expended considerable effort in an attempt to develop processes and formulations which enrich the nutritional value of meat products to offset these cooking losses without adversely affecting the palatability of the treated product.

Many compositions have been previously proposed for introduction into meat products to improve various meat properties such as flavor, texture, tenderness, nutritional value or storage life. Most commonly these materials are injected into a meat mass in liquid form. Among the liquid additives so far employed are enzymes, fatty substances, seasoning materials, vitamins and soluble proteinaceous materials. Representative of processes wherein proteinaceous materials are introduced into meats include: Hawley et al. Pat. No. Re. 30,023 which discloses injecting a salt-tolerant protein isolate; Savage et al. U.S. Pat. No. 3,506,455 which discloses the impregnation of raw meat with organic hydropholic materials including proteins: Williams U.S. Pat. No. 3,573,063 which relates to a method of injecting blood or milk into meat products; and Kadone et al. U.S. Pat. No. 4,164,589 which discloses a meat pumping process using soy protein isolate. Additionally, it is known to incorporate amino acids and mixtures of amino acids derived from the hydrolysis of natural proteins into meats in order to overcome taste defects and other deficiencies.

Tichy U.S. Pat. No. 2,418,914 describes a process for tenderizing meat by the injection of edible matter which can include particulate materials into the fibrous tissue of raw meat using a high pressure spray which does not produce costly visible openings on the surface of the carcass. Numerous other patents disclose other impregnation methods for the above-disclosed materials which include the use of hollow needles inserted into the meat tissue.

The prior art has not however, achieved a process which economically enriches and stabilizes the nutritional content of meat while simultaneously utilizing otherwise low value animal components and by-products.

Accordingly, it is an object of the present invention to provide an enriched meat product which exhibits improved flavor and tenderness, increased nutritional values and enhanced nutrient and weight stability upon cooking when compared to meat treated by prior art methods.

It is a further object of the present invention to provide a process for economically upgrading low quality cuts of meat by introducing insoluble animal protein materials into the tissue of these meat cuts.

A still further object of the present invention is to provide a nutritionally enriched meat product which can, for example, be utilized in third world countries having a shortage of high protein source foodstuffs.

These and other objects which will be apparent to one skilled in the art are achieved by providing a method for treating a solid animal meat mass to provide a meat product which exhibits enhanced nutritional values and stability upon cooking, which method comprises introducing into the tissue structure of this solid meat mass an aqueous colloidal dispersion comprising insoluble animal protein particles obtained by comminuting animal products, and a binder which sets sufficiently at cooking temperatures to reduce losses associated with cooking. The present invention also relates to the enriched animal meat product produced by this process.

In the preferred embodiment, a dispersion of colloidal size meat particles from comminuted by-products of the same animal type is treated to give the composition self-binding properties, and this self-binding particulate protein dispersion is then injected into the muscle meat cut to provide uniform distribution of this dispersion in the muscle. The self-binding properties of this dispersion result in binder coagulation at cooking temperatures which serves to stabilize the treated product against nutritional and weight losses. Dispersion injection is preferrably accomplished by needle or needleless injection and can be advantageously followed by a differential pressure cycling treatment which enhances the distribution of the injected materials into the meat tissue.

DETAILED DESCRIPTION OF THE INVENTION

The process of the present invention is applicable to upgrade or enhance meat masses derived from any animal source normally utilized as a food product. These typically include mammals such as beef, sheep and pork, birds such as poultry and fish. The term "meat" is used herein in the scientific sense which includes the post-mortem aspect of the three hundred or so anatomically distinct muscles of the animal body together with the connective tissue in which the muscle fibers are deposited and such intermuscular fat as cannot be trimmed without breaking the muscle as a whole. The material thus defined, represents by far the major edible portion of the animal carcass. A typical mammalian muscle mass, after rigor mortis but before post-mortem degradative changes, contains about 75% water and 20% protein. The remainder comprises various lipids, carbohydrates, miscellaneous organic substances and vitamins.

The meat which is processed according to the present invention is preferably in its raw state. The treatment of the present invention can be affected utilizing large meat masses such as a side of beef, or smaller individual cuts of meat. In some instances it is preferable to utilize meat which has not yet undergone rigor mortis induced changes, e.g., hot boned beef. By utilizing this freshly slaughtered animal meat the distribution and enhancement of the process of the present invention may be facilitated. In addition, meat in this fresh condition will contribute more binding proteins to the meat system.

While the meat utilized according to the present invention is preferably raw and as fresh as possible, it is desirable in some instances to pretreat the meat cuts prior to the practice of the present invention. Such treatments can include mild precooking, as long as the temperature in the meat is maintained below the denaturization temperature of binder proteins present. In addition, other preliminary preparation steps known in the art such as massaging, i.e., tumbling, with salt or phosphates can be employed.

In the process of the present invention the above-described meat product is treated to introduce into the tissue structure of the meat mass an aqueous colloidal dispersion comprising insoluble animal protein particles obtained by comminuting animal products and a binder for said protein particles. The term insoluble animal protein particles is intended to include particles obtained from muscle and organ meats, connective tissues, and skins. More specifically, suitable materials from which the comminuted insoluble animal protein particles can be obtained include lean meat scraps, tripe, soft tissue, trimmings, mechanically deboned meat, head meat, cheeks, lips, oxtails, tongues, hearts, cartilage, tailings of a desinewing operation, skins and other edible offal. According to the process of the present invention, a comminuted insoluble animal protein material of the type described above can be utilized in any meat cut without regard to source. It is preferred, however, to employ the insoluble protein particles which have been derived from the same type of animal which is being treated. Thus, protein particles derived from beef scraps may be introduced into a beef muscle cut whereas pork derived protein particles are introduced into cuts of pork.

The process of preparing an aqueous colloidal dispersion of insoluble animal protein particles and a binder of said protein particles will now be described. The first step in this process comprises the comminution of animal products as described above. For certain animal products, it may be necessary to remove fat portions by trimmings. The nature of a comminution step will vary somewhat with the type of animal product being processed. Materials having high moisture content such as organ tissues may simply be comminuted as is, whereas dryer products may require the addition of water to facilitate comminution. Although not required, it is preferred to effect the size reduction in at least two stages. The first stage of the comminution step present preferably involves a coarse chopping which can be effected in any of the well known and commercially available chopping equipment such as, for example, the Seydelmann chopper. In the final stage of comminution the coarsely chopped material is preferably subjected to milling or similar size reduction techniques, for example, in a emulsification mill of the kind available from Karl Schnell, Inc. It will be recognized, of course, that some animal products already exhibit fine particle size properties as produced, for example mechanically deboned meat, and these products might not require a separate comminution step.

The size reduction step is preferably continued until the animal product particles are in the colloidal or near colloidal range. Typically, particles are termed colloidal in the range of from about 1 to 100 millimicrons. In the process of the present invention, the term colloidal dispersion refers to a dispersion of particles in this size range and also includes dispersions containing particles somewhat larger, i.e., up to about 1000 millimicrons.

After the comminution step is completely effected, it may be necessary to adjust the water content of the resulting dispersion. In many cases, however, the moisture content of the animal product comminuted will provide sufficient moisture to form the desired dispersion. Whether or not added water is required, the final dispersion should generally contain from about 10 to 50% solids by weight, and preferably from about 30 to 40% solids. Most preferred is a dispersion having a solids content of from about 32 to 38%. In practice, the higher the solids content the better the resulting yield of product. On the other hand, lower solids contents dispersions are more easily introduced into the animal meat tissue. Moreover, the appropriate solids content for any given meat type will vary widely depending on the nature of the meat cut and its processing history.

The other important element of the aqueous dispersion utilized according to the present invention, is a binder for the insoluble protein particles and soluble nutrient values associated therewith. This binder can comprise any binder or binder system which is compatible with the meat protein system and which will set at temperatures employed in cooking the final meat product to stabilize the introduced insoluble meat particles and prevent losses of these and other materials (e.g. soluble nutrients and water) during cooking. Among the classes of materials suitable for use as such a binder are heat coagulatable proteins, and various carbohydrate materials and their derivatives which are known and utilized for their binder properties. Among the many suitable binder materials in these classes are gelatin, pectins, starches, and gums.

The preferred binder system, however, is one developed in situ as a result of the comminution of the employed animal protein product. Animal meat products contain three basic protein types: myofibrillar proteins, including primarily myosin and actin; sarcoplasmic proteins which are the water soluble proteins of the fluid sarcoplasm, including the muscle pigment myoglobin and the enzymes of the glycolytic pathway; and finally those connective and supportive tissue proteins and insoluble enzymes. While the myofibrillar proteins are generally insoluble in pure water, these proteins, and particular myosin, are soluble in solutions containing more than 3.5% salt. Accordingly, in order to develop in the aqueous dispersion a soluble proteinaceous binder system, it is preferred to add a requisite salt content to the chopping operation to promote solubility of primarily myosin and to a lesser extent actin. This proteinaceous binder system is heat coagulatable and thus serves to bind and stabilize injected materials upon the subsequent cooking of the treated meat mass. Certain animal protein products, such as those which are primarily collagenous in nature, may require separate addition of binder materials based on, for example, proteins or carbohydrates.

The in situ development of proteinaceous binder materials is also facilitated to a certain extent by the mechanical working in the communition step. In some instances this mechanical working will result in the solubilizing sufficient binder protein materials to provide the binder properties of the aqueous dispersion required.

The amount of binder either added or developed in situ will depend, of course, on the nature of the binder system and the material which is being treated. The binder should be present in an amount effective to bind at least a substantial portion of the added nutrient values present in the material introduced into the meat product. As an upper level, the binder system should not be present in such a great amount as to adversely affect the handling and injection qualities of the resulting aqueous dispersion. Where the binder system developes primarily as a result of coagulation or gelling subsequent to its injection, the only significant upper limit on binder amount will be dictated by practical and economic considerations. Typically such a binder system should be present in an amount of at least about 10% by weight based on the added colloidal dispersion. Preferred are binder amounts from about 10% to about 30% by weight.

The treating agent of the present invention, which has been described as comprising an aqueous dispersion of insoluble animal protein particles and a binder for these particles, can additionally contain a wide variety of subsidiary additives. Generally, any additive which is compatible with the aqueous dispersion and the meat tissue matrix into which it will be injected can be utilized. Among the classes of materials which can be advantageously incorporated in the aqueous dispersion treating agent of the present invention are soluble or insoluble additives to affect the color, flavor or nutritional values of the final product. Among the typical additives which can be employed are monosodium glutamate, non-animal proteins and starches, blood plasma, egg whites, milk proteins, soy proteins, hydrolized plant proteins, torula, vegetable starches, pregelatinized starches, oxidized starches, phosphated starches, cross linked starches, nitrates and nitrites, sugar and sugar syrups, carageenan, alginates and other gums, pectins, mustard, yeast, and the like.

In addition to the above described additives, it may be desirable in some instances to employ additional treatment steps in the preparation of the aqueous dispersion of insoluble animal protein particles. Among the known treatment steps which facilitate either disintegration of the animal protein products or the solubilization of these materials to achieve better binder properties are the use of proteolytic enzymes and the use of alkaline treating agents such as ammonium hydroxide. Examples of these types of protein treatment processes can be found in Staackmann et al U.S. Pat. No. 3,062,655 and Brody U.S. Pat. No. 3,113,030.

Prior to utilization, the above described aqueous dispersion may require pH adjustment. The exact pH requirements of the system will vary widely and depend on the nature of the protein and binder systems employed and the type of product into which this dispersion is being introduced. Typically, however, the resulting product should have a pH in the range of from about 6 to 8. If required for a particular application, the pH of the aqueous dispersion can be adjusted with a compatible acid or base reactant to a value in this range or to that value which is determined to be optimal for that particular system.

Depending on the nature of the aqueous dispersion and the type of binding system employed, it may be desirable in some instances to utilize an emulsifying or dispersing agent in this aqueous dispersion. Among suitable emulsifiers which may be utilized are lecithin or mono- and diglycerides. Generally, emulsifying agents can be employed in concentrations of less than 1% by weight of the total dispersion.

Depending on the origin of the animal protein product, the percent solids in the dispersion, and the presence, if any, of additional vegetable proteinaceous materials, the protein content of the aqueous dispersion treating agent of the present invention can vary widely from about 10 to about 50% by weight. Typically, this aqueous dispersion will contain from about 15 to about 30% protein, with optimum protein content in the range from about 20 to 25% by weight.

The next step of the process of the present invention comprises introducing the above-described aqueous dispersion of insoluble protein particles and binder into the meat mass. The extent of this introduction and manner chosen to affect it will depend somewhat on the objective in producing a particular product. In some instances, it may be desirable to introduce the aqueous dispersion only into a surface layer of the meat mass. It will be recognized that a product treated in this fashion will not have the maximum amount of nutritional enhancement but may have desired enhanced stability on cooking due to the reduced cooking losses at the surface of the product. It is generally desirable, however, to completely and uniformly distribute the aqueous dispersion throughout the meat mass to provide a product with maximally enhanced nutritional properties as well as increased resistance to cooking losses.

In the preferred manner of introduction, the aqueous dispersion is injected into the tissue structure of the meat mass. This injection process preferably is accomplished using conventional apparatus designed generally for the injection of substances into meat. These apparatus commonly employ hollow needles or high pressure sprays directed at the product (so-called needleless injection). The details of apparatus and methods for these commonly employed injection techniques are described, inter alia in Sholl U.S. Pat. No. 3,649,299 and Tichy U.S. Pat. No. 2,418,914, both of which are incorporated herein by reference.

The temperature at which injection takes place can vary depending on other processing conditions, but generally should be somewhere from above the freezing temperature of the meat up to room temperature or slightly higher. More specifically, most meat cuts can be treated according to the process of the present invention by injecting the aqueous dispersion into the mass at a meat temperature of from about 24° F. up to about 42° F.

While the introduction step can comprise merely injecting dispersion in the above-described manner, it is preferred to follow the injection step with a process step designed to aid in the uniform distribution of injected materials. Various known methods can be employed to aid in the uniform distribution of injected dispersion. One such technique is tumbling or vacuum tumbling of the meat, sometimes referred to as massaging. Another technique which is suitable for promoting uniform distribution of injected material in the meat mass is the use of differential pressure cycling. In this process the meat having the above-described aqueous dispersion injected therein is placed in a pressure vessel and subjected to alternate cycles of elevated pressure and vacuum. It is believed that this differential pressure cycling action causes capillary activity which promotes the absorbance and distribution of injected materials within the muscle tissue structure. In the preferred introduction process of the present invention, the combination of all three of the above techniques, i.e., injection, tumbling and pressure cycling, are utilized to produce a meat mass impregnated with a uniform distribution of aqueous dispersion.

As indicated above, the injection step may utilize either needles or needleless injection techniques. In the use of needle injection, commercially available equipment such as the metalguimia injector may be employed. This piece of equipment can be equipped with anywhere from 8 to 400 needles, the ones suitable for the process of the present invention typically being about 4 millimeters in diameter, 5 to 9 inches long, and having a hollow bore of about 0.002 inches. In utilizing such a machine it may be desirable to subject the meat mass to multiple passes to insure more uniform distribution of the aqueous dispersion in the meat mass.

The product of the present invention as produced by the above described method, is an animal meat product which exhibits enhanced flavor, tenderness and nutritional properties and stability on cooking. This product comprises a mass of solid meat tissue containing distributed therein an added aqueous colloidal dispersion comprising insoluble animal protein particles obtained by comminuting animal products and a binder which sets sufficiently at cooking temperatures to reduce nutrient losses associated with cooking.

The amount of aqueous dispersion introduced into the meat mass can vary widely depending on the product objectives. At the lower limit, all that is necessary is to add sufficient aqueous dispersion to increase the product nutritional and stability factors. Typically, additions as low as 10% by weight of aqueous dispersion based on the unpumped (green) weight of the meat can achieve these results. Even lower additive amounts can be employed if only the surface of a meat mass is to be penetrated and treated according to the process of the present invention. At the upper level, the amount of aqueous dispersion introduced into the meat mass is that which does not adversely disrupt the tissue or otherwise effect the appearance or taste of the meat product involved. Typically, amounts of aqueous dispersion of up to 200% or more can be added without adverse affect. Preferred are additive amounts of from about 25 to about 150% by weight.

The product of the present invention exhibits a significant increase in nutritional value and, more specifically, in protein content. Typically, meat masses with up to twice the amount of protein originally present can be produced according to this process without any adverse affects on the products characteristics. These increased nutritional values are achieved even after cooking losses have been subtracted due to the increased stability of the injected protein particles which results from the inclusion of a binder in the injected aqueous dispersion.

The following Example is intended to illustrate more fully the nature of the present invention without acting as a limitation on its scope.

EXAMPLE

This example demonstrates one preferred form of the process of the present invention. A meat mass comprising 400 grams of beef (a poor quality cut) is enhanced with 200 grams of an aqueous colloidal dispersion of comminuted beef by-products (35% solids) prepared in a Schnell emulsification mill. This procedure results in the in situ development of sufficient soluble protein binder. The meat mass is first injected with the above-described aqueous dispersion under slight vacuum conditions at a temperature of about 32° F. using a Metalquima injector equipped with 4 mm diameter needles (0.002 inch bore). The injected mass is then tumbled for about 40 minutes in a massager to aid in the distribution of the injected dispersion which initially may be present in discrete pockets in the muscle tissue. The tumbling step also helps to develop additional proteinaceous binder in situ from the protein materials initially present in the meat. In the next step, the injected tumbled meat is stored under refrigerated conditions for six to eight hours to achieve equilibrium. Finally, the meat mass is subject to pressure cycle treatment in a closed pressure vessel at about 38° F. In this cyclic treatment a vacuum cycle of about 28 inches of mercury is alternated with a pressure cycle of from about 10 to 15 psig. Each of the cycles (vacuum and pressure) is continued for about 3 to 5 minutes.

The resulting product exhibits significantly enhanced nutritional values and upon cooking, the losses of soluble nutrients are much less than in the case of a similarly cooked meat mass which is not treated according to the process of the present invention.

While certain specific embodiments of the invention have been described with particularity herein, it will be recognized that various modifications thereof will occur to those skilled in the art. Therefore, the scope of the invention is to be limited solely by the scope of the appended claims.

We claim:

1. A method for treating a solid animal meat mass to provide a meat product which exhibits enhanced nutritional values and stability upon cooking, said method comprising introducing into the tissue structure of said meat mass from about 10% to about 200% by weight based on the weight of said meat mass of an aqueous colloidal dispersion comprising insoluble animal protein particles obtained by comminuting animal tissue, and a binder selected from the group consisting of heat coagulatable soluble proteins, starches, pectins and gums which binder sets sufficiently at cooking temperatures to reduce losses associated with cooking.

2. An animal meat product which exhibits enhanced nutritional values and stability upon cooking, said meat product comprising a solid mass of animal meat tissue having distributed throughout at least a portion thereof from about 10% to about 200% by weight based on the weight of said meat mass of an aqueous colloidal dispersion comprising insoluble animal protein particles obtained by comminuting animal tissue and an added binder selected from the group consisting of heat coagulatable soluble proteins, starches, pectins and gums which binder sets sufficiently at cooking temperatures to reduce losses associated with cooking.

3. The invention of claims 1 or 2 wherein said solid meat mass is obtained from an animal selected from the group consisting of cattle, sheep, pigs, poultry and fish.

4. The invention of claims 1 or 2 wherein said solid meat mass is a low grade cut of meat.

5. The invention of claims 1 or 2 wherein said insoluble animal protein particles are obtained from animal tissue selected from the group consisting of muscle tissue, organ tissue, connective tissue and skin.

6. The invention of claims 1 or 2 wherein said animal products and said meat mass are obtained from the same type animal.

7. The invention of claims 1 or 2 wherein said dispersion also contains soluble animal or vegetable protein materials.

8. The invention of claims 1 or 2 wherein the particles in said dispersion are from about 100 to about 1000 millimicrons in size.

9. The invention of claims 1 or 2 wherein said dispersion comprises from about 10 to about 50% by weight of solids.

10. The invention of claims 1 or 2 wherein said dispersion contains at least 10% by weight of said binder.

11. The invention of claim 1 wherein the step of introducing comprises injecting said dispersion into said meat mass.

12. The invention of claim 11 wherein said injecting is effected with hollow needles.

13. The invention of claim 11 wherein said injecting is effected with a needleless injection device.

14. The invention of claim 11 additionally comprising the step of treating said meat mass after injection to distribute the injected dispersion through the tissue of said meat mass.

15. The invention of claim 14 wherein the distribution step comprises tumbling said meat mass.

16. The invention of claim 14 wherein the distribution step comprises subjecting said meat mass to alternating cycles of pressure and vacuum in a closed vessel.

17. The invention of claim 15 additionally comprising the step of subjecting said meat mass to alternating cycles of pressure and vacuum in a closed vessel after said injecting and tumbling steps.

18. The invention of claim 1 wherein said dispersion is introduced uniformly throughout said meat mass.

19. The invention of claim 1 wherein said dispersion is introduced only into areas of said meat mass adjacent to the surface of said meat mass.

20. The invention of claim 1 wherein said meat mass is maintained at a temperature of from about 24° to about 42° F. during said introducing step.

* * * * *